C. A. FREDERICKS.
Weighing-Scale.

No. 205,850.  Patented July 9, 1878.

ATTEST:  
Arthur C. Fraser.  
Wm P. Brown

INVENTOR:  
Christian A. Fredericks  
By his Attorneys,  
Burke & Fraser

UNITED STATES PATENT OFFICE.

CHRISTIAN A. FREDERICKS, OF BROOKLYN, NEW YORK.

IMPROVEMENT IN WEIGHING-SCALES.

Specification forming part of Letters Patent No. 205,850, dated July 9, 1878; application filed May 7, 1878.

*To all whom it may concern:*

Be it known that I, CHRISTIAN A. FREDERICKS, of the city of Brooklyn, in the county of Kings and State of New York, have invented certain Improvements in Counter-Scales, of which the following is a specification:

Heretofore, in the construction of even-balance trip-scales, and scales combining half of a trip-scale with spring-balance, it has been customary to pivot or support the platform upon two bearings on the beam immediately below the platform, and to preserve the level of the platform as the beam moves up and down a central rod or "arbor" projects vertically below the platform, and is pivoted to a link in the hollow base. Scales constructed in this manner are liable to weigh incorrectly if the article to be weighed is not placed in or very near the center of the platform. If the weight be placed on one corner, one of the pivot-points upon which the platform is supported is liable to be lifted entirely out of its bearing and the scale rendered wholly untrustworthy.

To remedy the above defects is the principal object of my present invention, which I will now describe.

Figure 1:
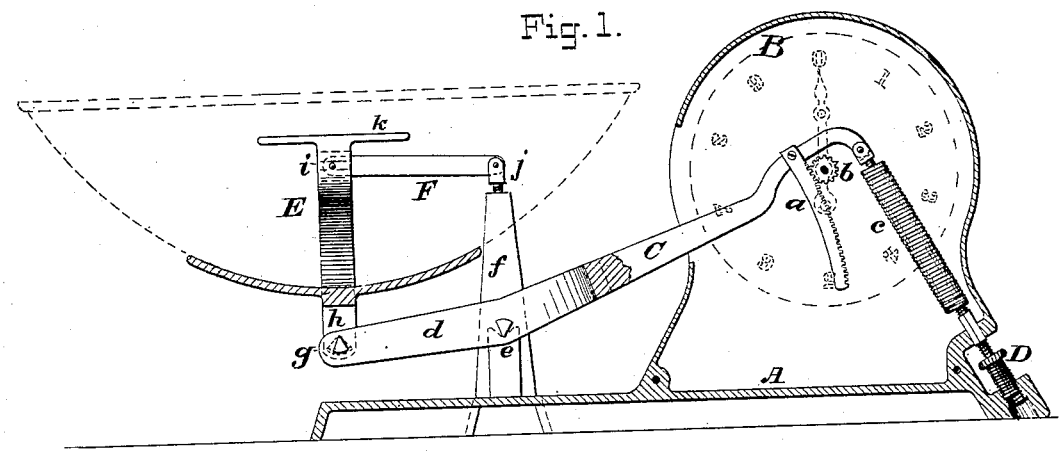
Figure 2:
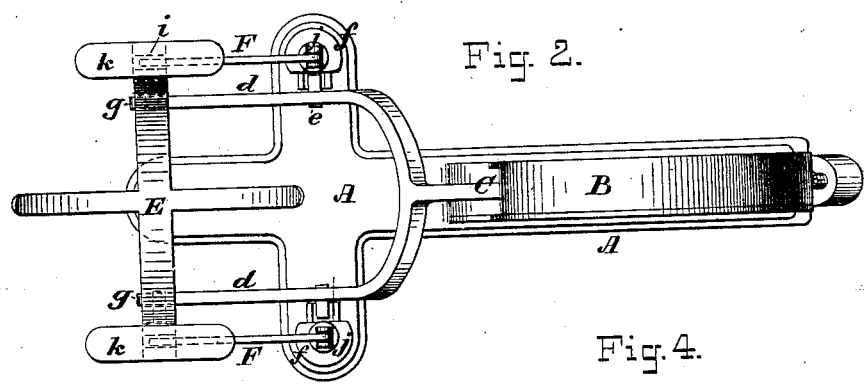
Figures 3, 4:
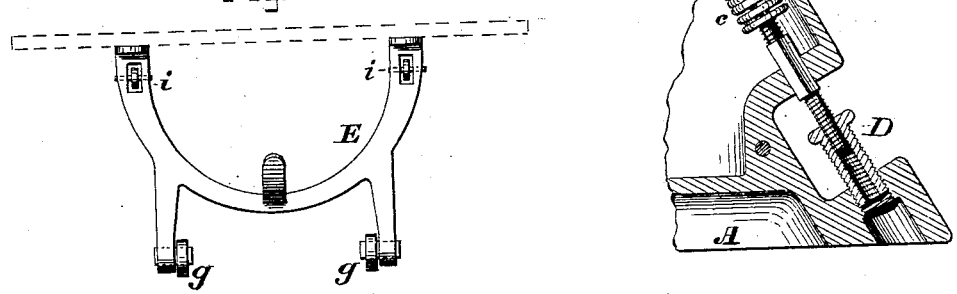

In the drawings, Figure 1 is a longitudinal sectional view of my improved scale. Fig. 2 is a plan of the same. Fig. 3 is an end or front view of the scoop-platform frame. Fig. 4 is a detail view of the adjusting-screw.

A represents an ordinary hollow cast-metal base, bearing a casing, B, for the spring and rack-and-pinion mechanism, the walls of the casing being adapted to serve as a base for the usual dials. C is the beam. $a$ is the rack. $b$ is the pinion. $c$ is the spring, and D is the adjusting-screw. The beam C is bifurcated in the ordinary way, and the forks $d\ d$ have sensitive fulcrum-bearings at $e\ e$ in posts $f\ f$, which rise from the base A. The fulcrum of the beam is low down, near the base, and the forks or branches $d\ d$ extend back and support, on "knife-edges" $g\ g$, the two legs $h\ h$ or equivalent parts of the platform-frame E.

F F are two links, which take hold of the frame E at $i\ i$, and are jointed or attached at the other ends to screws $j\ j$ in the tops of the posts $f\ f$. The points $i\ i$ are placed as widely apart as the frame E will permit, and the bearing-points $g\ g$ are placed as far below them and the platform as the construction of the scale will conveniently permit.

By this construction and arrangement of parts the platform is raised a considerable distance above the bearing-points, and it is supported on both sides, at or near its extreme outer edges, by the links F F, thus securing the object sought—*i. e.*, that wherever on the platform the object to be weighed is placed, it will not disturb the integrity of the bearings, and the angle of pressure, so to speak, will be less upon the bearings than in the ordinary construction.

To insure accuracy in the scale and to preserve with accuracy the level of the platform, it is necessary that the distance between the point $i$, where the link is pivoted to the frame E, and the pivot-point or bearing $g$, should be precisely the same as the distance between the fulcrum-point $e$ and the point where the link F is pivoted to the screw $j$. And to insure this the screws $j\ j$ are arranged to be driven in or run out in fitting up or adjusting the scale to preserve the parallel motion of the parts. As an equivalent for the screws, a pin might be arranged to slide up and down, and be fixed by a nut or set-screw. As the links F F always move together and alike in every respect, they may be connected rigidly together without departing from my invention.

The frame E is provided with caps $k\ k$ or some equivalent provision to receive a platform, as indicated in dotted lines in Fig. 3; but at the same time it is curved laterally, as seen in the same figure, and arranged to receive a scoop, as shown in dotted lines in Fig. 1. Thus it may be changed in a moment to suit either platform or scoop.

The spring $c$ is arranged with its axis approximately at right angles with the lever when the latter is at its medium of depression, and the screw-rod upon its lower end engages a female screw in a milled tubular screw, D, the male screw on which engages a female screw in the base A. One is a right and the other is a left handed screw. By this screw the tare may be regulated if desired, or the spring adjusted after use has weakened it.

I claim—

1. In a scale, the arrangement of the link or links F F so as to take hold of the platform or its frame on each side at a point above where the frame rests upon the beam, substantially as and for the purposes set forth.

2. In a scale, the combination of the forked beam C, pivoted at $e\ e$, the frame E, arranged to rest upon the beam at two points, $g\ g$, and the link or links F F, pivoted at $j\ j$, and to the frame E or its attached platform at $i\ i$, the points $i\ j$ being above the points $e\ g$, all substantially as and for the purposes set forth.

3. In a scale, the combination of the frame E, the link or links F F, arranged to take hold of the same on each side and preserve its equilibrium, the forked or double beam C, and the spring $c$, all arranged substantially as set forth.

4. The frame E, curved and adapted to receive a scoop, and provided also with flattened caps $k\ k$, or their equivalents, constructed and adapted to receive and support a platform, substantially as set forth.

In witness whereof I have hereunto signed my name in the presence of two subscribing witnesses.

CHRISTIAN A. FREDERICKS.

Witnesses:
 ARTHUR C. FRASER,
 HENRY CONNETT.